May 15, 1934.    F. L. CAPPS ET AL    1,958,564
MOTOR DRIVE
Filed Oct. 18, 1930
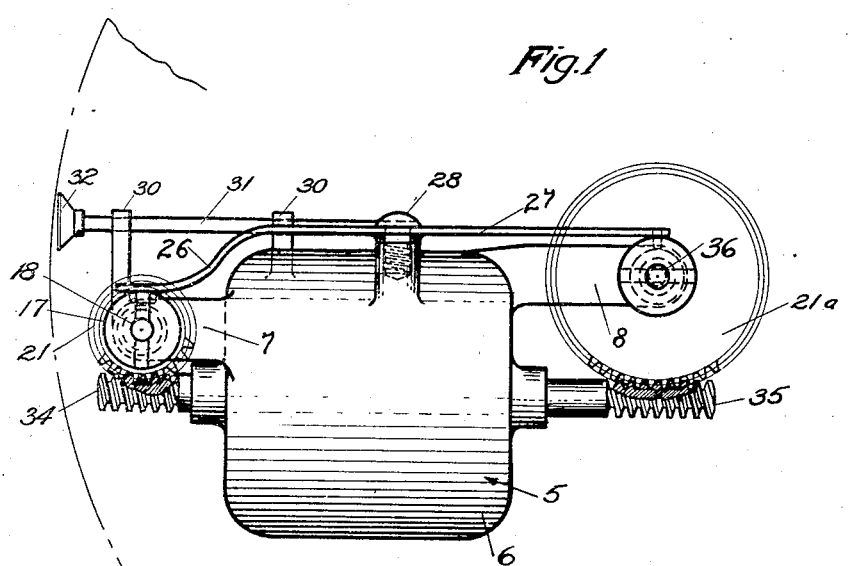
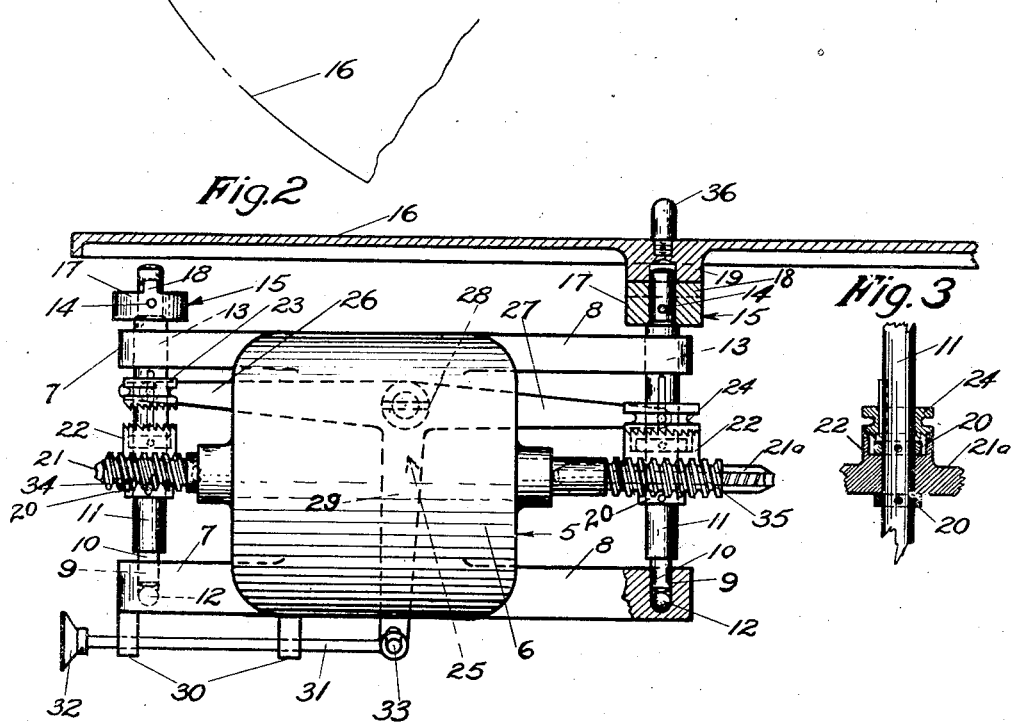
INVENTORS
JOHN O. PRESCOTT
FRANK L. CAPPS
BY
John A Hanrahan
ATTORNEY Patented May 15, 1934

1,958,564

UNITED STATES PATENT OFFICE 1,958,564

MOTOR DRIVE

Frank L. Capps, Milford, and John O. Prescott, Glenbrook, Conn., assignors to Columbia Phonograph Company, Inc., Bridgeport, Conn., a corporation of New York Application October 18, 1930, Serial No. 489,614

6 Claims. (Cl. 274—9)

This invention relates to new and useful improvements in motor drives.

An object of the invention is to provide means whereby a single motor may be used to drive two shafts or spindles, the shafts being driven preferably at constant speeds, but one shaft being driven at greater speed than the other.

Another object is to provide a motor drive including a synchronous motor and means whereby the motor drives a pair of shafts at different speeds.

A further object is to provide a motor drive, including a motor having its shaft extending from each of its ends, each end of the shaft being geared to a spindle whereby to drive the spindles at different speeds, each spindle at one of its ends being constructed to receive a turntable, the spindles being relatively close together whereby when the turntable is on one spindle it will extend over and cover the other.

An additional object is to provide a phonograph mechanism including a pair of shafts each gear to the same motor to be driven at different speeds by the motor, a turntable shiftable from one of the shafts to the other, and clutch or other means whereby the motor drives but one shaft at a time.

Other objects and advantages will become apparent from a consideration of the following description taken in connection with the accompanying drawing showing an embodiment of the invention. In connection with this drawing and description it is to be understood that they are for the purpose of making clear the principals of the invention and disclosing one specific embodiment. Therefore, the invention is not limited to the disclosure but includes all such changes and modifications as fall within the scope of the appended claims to which reference must be had for a definition of the limitations of the invention.

In the drawing:

Figure 1 is a top plan view of a motor drive in accordance with the invention, a portion of a phonograph turntable being suggested by broken lines;

Fig. 2 is a side elevational view thereof; and

Fig. 3 is a detail sectional view of one of the clutches employed.

Referring in detail to the drawing, 5 indicates a motor which may or may not be constructed in accordance with the disclosure in application Serial No. 450,997 filed May 9th, 1930, but which is preferably of the synchronous type.

Motor 5 includes a casing 6 which may carry and preferably has formed integral with it, upper and lower similar pairs of extension or bearing members 7 and 8. Each of the lower bearing members 7 and 8 are recessed as at 9 to receive the lower end portions 10 of vertically disposed shafts 11. Within each of the recesses 9 is a ball 12 against which the ends of the shafts 11 bear.

Shafts 11 extend through openings 13 in the upper bearing members 7 and 8 and secured to the upper portions of the shafts, as by pins 14 are coupling or mounting members 15 for a turntable 16. The couplers 15 each include a body portion 17 and an upstanding rib-like portion 18 adapted to fit into a co-operating notch in the hub 19 of the turntable 16 whereby the turntable will be secured to the shafts for movement therewith. However, means other than that described may be used to establish a driving connection between the shafts and the turntable, the particular connection not being a feature of the present invention.

Mounted between collars 20 on one of the respective shafts 11 are worm gears 21 and 21a, the worm gears being mounted to turn on the shafts. Means may be provided for alternately securing the worm gears 21 and 21a to the shafts 11 and to this end each gear may include an annular extension 22 having clutch teeth in its upper edge to co-operate with the respective clutch elements 23 and 24.

Elements 23 and 24 are slidably keyed to the respective shafts 11 and means are provided for alternately shifting the elements to alternately engage them with the respective clutch portions 22 of the worm gears 21 and 21a. This means as shown takes the form of a substantially T-shaped lever 25 having lateral arms 26 and 27 engaging clutch elements 23 and 24, the lever being pivoted at 28 and having the depending operating portion or arm 29.

Mounted in brackets 30 is a push rod 31 having an operating button 32 at one end and at its other end pivotally connected to the lower end of arms 29 as at 33. It will be obvious from Fig. 2 that on the rod 31 being pushed, the lever 25 will be rocked about its pivot 28 to shift clutch element 24 upwardly and clutch element 23 downwardly to break the driving connection between the gear 21a and its shaft 11 and establish a driving connection between the gear 21 and its shaft 11. On the rod 31 being thereafter pulled the order of drive will be reestablished to be that shown.

Should it be deemed advisable this entire clutch mechanism may be omitted and in that event one of the spindles if unused may be permitted to turn idly in its bearing.

The shaft of motor 5 projects from each end of the casing and carries worms 34 and 35 meshing respectively with the gears 21 and 21a. Obviously this gearing is not in the same ratio and since the shaft at each end of the motor is moving at the same speed the motor will drive the shafts 11 at different speed. As geared up the arrangement is such that one shaft 11 will be driven at 33⅓ R. P. M. while the other will be driven at 78 R. P. M.

It is to be understood that these figures as to speed are only by way of example and that they may be varied as occasion demands. Ordinary commercial records are recorded to be reproduced at about 78 to 80 R. P. M. Other records are recorded to be reproduced at 33⅓ R. P. M. Through the use of the present arrangement it will be possible to reproduce from either type of record.

In radio broadcasting for example, both types of records are used. The 16 inch 33⅓ R. P. M. record constitutes a full fifteen minute program, the time between station announcements. However, the period may be covered through the use of several of the smaller diameter higher speed records.

Other fields in which the present structure might be used readily suggest themselves. However, it is believed that sufficient uses have been pointed out and that the possibilities of wide application of the invention in other connections will be apparent.

The turntable 16 carries a centering pin 36 for the records and owing to the particular driving connection from the shafts 11 it is possible to shift the turntable from one shaft to the other. Since the shafts 11 are in relatively close relation, the turntable when on one will cover the other and owing to the clutch operating mechanism described, when one shaft is in use the other will be stationary.

From the foregoing description various modifications and changes will suggest themselves to those skilled in the art. These changes or modifications are contemplated by us and fall within the spirit of the invention and the scope of the appended claims.

Having thus described the invention, what is claimed is:

1. In a turntable driving means for a phonograph, a motor, a plurality of turntable shafts, driving connections between the motor and shafts whereby the motor drives said shafts, the driving connections between the motor and shafts being such that the motor drives the shafts at different speeds, a turntable shiftable from one of said shafts to the other thereof, and means whereby the motor drives but one of said shafts at a time.

2. In a turntable driving means for a phonograph, a motor, a plurality of turntable shafts, driving connections between the motor and shafts, whereby the motor drives said shafts, the driving connections between the motor and the shafts being such that the motor drives the shafts at different speeds, and means whereby the motor drives but one of said shafts at a time.

3. In combination, a motor including a horizontally disposed armature shaft projecting at each end of the motor casing, bearings at each end of the motor casing, a pair of vertically disposed shafts arranged in said bearings one at each end of the motor casing, a worm on each projecting end of the armature shaft and driven thereby, a worm gear on each of said vertical shafts and meshing with the respective worms, means for selectively clutching the worm gears to their respective shafts, and the gear ratios between the armature shaft and the respective vertical shafts being different whereby the vertical shafts are driven at different speeds by the armature shafts.

4. In combination, a motor including a horizontally disposed armature shaft projecting at each end of the motor casing, bearings at each end of the motor casing, a pair of vertically disposed shafts arranged in said bearings one at each end of the motor casing, a worm on each projecting end of the armature shaft and driven thereby, a worm gear on each of said vertical shafts and meshing with the respective worms, and the gear ratios between the armature shaft and the respective vertical shafts being different whereby the vertical shafts are driven at different speeds by the armature shafts.

5. In combination, a motor including a horizontally disposed armature shaft projecting at each end of the motor casing, bearings at each end of the motor casing, a pair of vertically disposed shafts arranged in said bearings one at each end of the motor casing, a worm on each projecting end of the armature shaft and driven thereby, a worm gear on each of said vertical shafts and meshing with the respective worms, means for selectively clutching the worm gears to their respective shafts, the gear ratios between the armature shaft and the respective vertical shafts being different whereby the vertical shafts are driven at different speeds by the armature shafts, a coupling means on each of said vertical shafts adjacent its upper end, and a phonograph turntable having a coupling means to cooperate with the coupling means on the vertical shafts whereby said turntable may be driven by said shafts.

6. In combination, a motor including a casing and a horizontally disposed armature shaft, bearings supported by said casing, a pair of vertically disposed shafts arranged in said bearings, a pair of worms on said armature shaft and driven thereby, a worm gear on each of said vertical shafts and meshing with the respective worms, and the gear ratios between the armature shaft and the respective vertical shafts being different whereby the vertical shafts are driven at different speeds by the armature shaft.

FRANK L. CAPPS.
JOHN O. PRESCOTT.